R. E. HELLMUND.
COMMUTATING MEANS FOR DYNAMO ELECTRIC MACHINES.
APPLICATION FILED SEPT. 13, 1916.

1,335,110.

Patented Mar. 30, 1920.
2 SHEETS—SHEET 1.

WITNESSES:

INVENTOR
Rudolf E. Hellmund.
BY
ATTORNEY

R. E. HELLMUND.
COMMUTATING MEANS FOR DYNAMO ELECTRIC MACHINES.
APPLICATION FILED SEPT. 13, 1916.

1,335,110.

Patented Mar. 30, 1920.
2 SHEETS—SHEET 2.

WITNESSES:

INVENTOR
Rudolf E. Hellmund.
BY
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

COMMUTATING MEANS FOR DYNAMO-ELECTRIC MACHINES.

1,335,110. Specification of Letters Patent. Patented Mar. 30, 1920.

Application filed September 13, 1916. Serial No. 119,866.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Commutating Means for Dynamo-Electric Machines, of which the following is a specification.

My invention relates to systems of field excitation for dynamo-electric machines of the commutating field type, and it has for its object to provide a system of the character designated whereby the commutating field winding may be properly excited under widely varying conditions of speed and load to compensate for the sparking voltage under the brushes.

Figure 1:
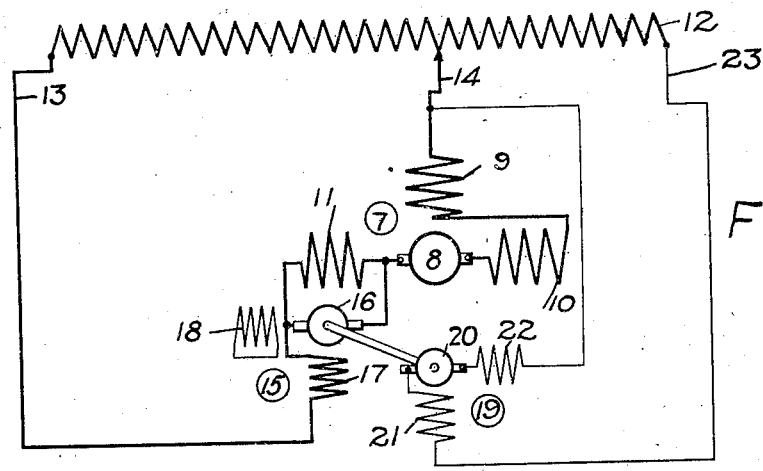
Figure 2:
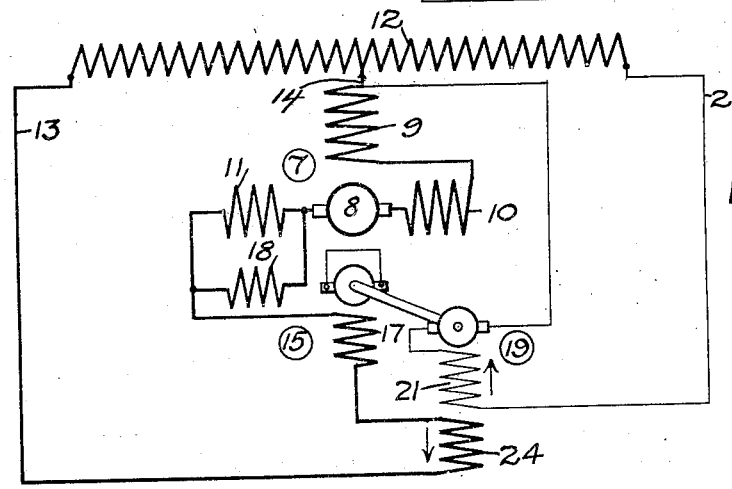
Figure 3:
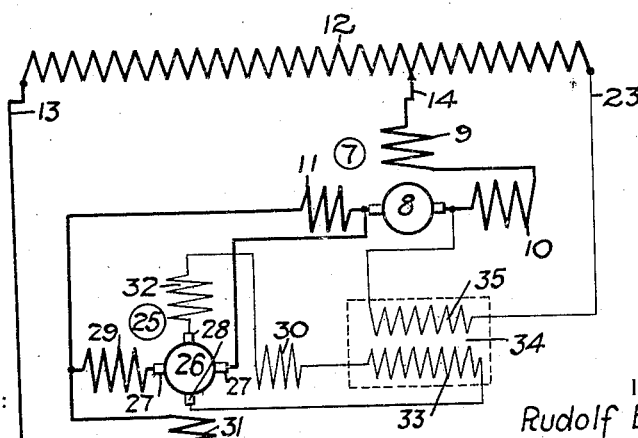
Figure 4:
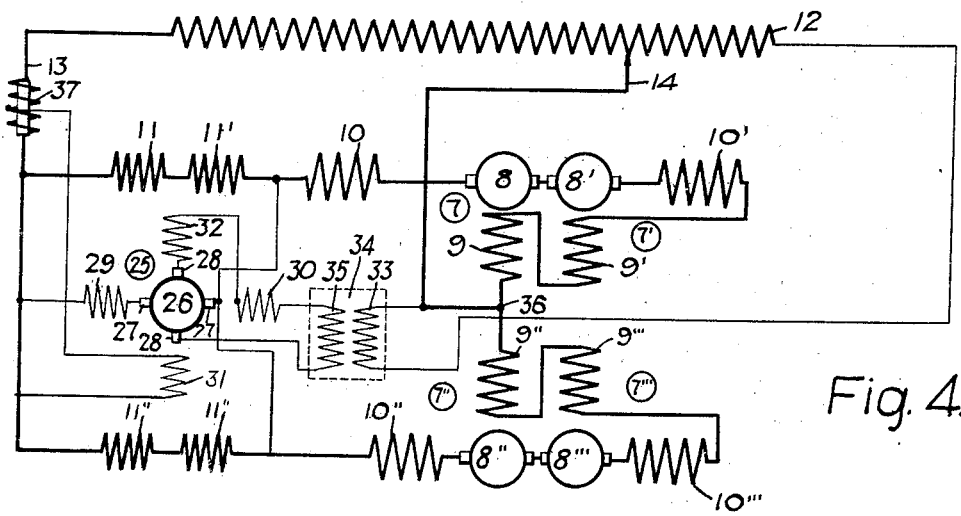

In the accompanying drawings, Figure 1 is a diagrammatic view of an alternating-current motor of the commutator type provided with a commutating field winding, together with associated supply circuits and other auxiliary apparatus embodying a preferred form of my invention; Figs. 2 and 3 are diagrammatic views of modifications of the system shown in Fig. 1; and Fig. 4 is a diagrammatic view of a system illustrating the application of my invention to a plurality of jointly-operating motors.

In the operation of an alternating-current motor of the commutator type, it is a well known fact that the sparking voltage under the brushes increases with an increase in the motor-load current and decreases with an increase in the motor speed. It is, therefore, necessary for satisfactory commutation obtained by the use of a commutating-pole winding to so excite said winding as to take account of these various factors.

By my invention, I produce the desired result by the use of an auxiliary dynamo-electric machine the exciting field of which varies in proportion to the load current of the main motor and the speed of which varies inversely with the speed of the main motor. I am thus enabled so to excite the commutating field winding of the main machine as to produce satisfactory commutation over the desired ranges of load and speed.

Referring to Fig. 1 of the drawing for a more detailed understanding of my invention, I show an alternating-current motor of the commutator type at 7, said motor comprising an armature 8, an exciting field winding 9, a compensating field winding 10 and an interpole or commutating field winding 11. Energy for the operation of the motor 7 is derived from any suitable source, such, for example, as a transformer winding 12 and, with the connections shown, the voltage supplied to the motor is that between the left-hand terminal 13 of the source 12 and an intermediate adjustable tap 14. An auxiliary exciting machine 15 of the commutator type is provided for the energization of the commutating field winding 11 and comprises an armature 16, an exciting field winding 17 and, if desired, a short circuited compensating winding 18 for inductive compensation. The exciting field winding 17 is connected in the lead from the terminal 13 of the source 12 so that said exciting field winding is energized by the load current of the motor 8. Thus, the output voltage of the machine 15 varies in substantial accordance with said motor-load current. Obviously, if desired, the exciting field winding 17 may be paralleled by a current shunt, or other equivalent means may be employed to avoid the necessity of conveying all of the load current of the main motor therethrough and to insure that a definite proportional part of said load current shall, at all times, traverse said winding.

The exciting machine 15 is driven by a commutator motor 19 which comprises an armature 20, an exciting field winding 21 and an inducing field winding 22, all connected in series relation between the adjustable tap 14 and the right-hand terminal 23 of the source 12.

When it is desired to increase the speed of the main motor 7, the voltage applied thereto is increased by moving the tap member 14 toward the right. This reduces the voltage applied to the motor 19, decreasing the speed thereof and, therefore, decreasing the speed and output voltage of the exciting machine 15. Thus, the excitation of the commutating field winding 11 of the main motor varies inversely with the speed thereof, and the joint action of the driving motor 19 and of the load-current-excited winding 17 is to produce the desired excitation of the commutating field winding 11 under widely varying conditions of load and of speed.

In certain cases, it is necessary to produce a more marked increase in the voltage applied to the commutating field winding of the main motor, with an increase of motor load, than is possible with the system shown in Fig. 1. Under these conditions, I may employ the system shown in Fig. 2 which is the same as that of Fig. 1 in its main details, like parts being similarly designated. The driving motor 19 is provided, however, with an additional field winding 24 which is connected to be energized by the load current of the main motor flowing from the terminal 13 and is arranged to oppose the exciting field winding 21. Thus, an increase in the load current of the main motor not only increases the excitation of the interpole field winding 11 by strengthening the exciting field of the exciter machine 15 but it further increases the output voltage of the machine 15 by raising the speed thereof through the speed increase of the driving motor 19 occasioned by the weakening of the exciting field thereof arising from the more complete neutralization of the field of the winding 21 by the field of the winding 24.

In many instances, the applied voltage of the main motor remains substantially constant but it is necessary to compensate for widely varying load currents therein. Under these conditions, it is not necessary to cause the speed of the auxiliary driving motor to vary inversely with the applied voltage of the main motor and I have, accordingly, shown the motor 19, in Fig. 2, connected across a fixed portion of the source 12 although, obviously, said motor might be connected between the terminal 23 and the tap 14, if desired.

The exciting machine 15 in Fig. 2 is shown as of the Winter-Eichberg generator type but there is a wide range of equivalent commutator machines that may be employed, as described in an article by the applicant and J. V. Dobson, appearing on page 112 et seq. of the *Electric Journal* for March, 1916.

The exciting generator 15 and the motor 19 may be consolidated in one machine, if desired, without departing from the spirit of my invention and, in this way, a radical decrease in the cost of the system may be effected. A system of this character is shown in Fig. 3 wherein the exciting voltage for the commutating field winding 11 is produced in a composite machine 25 of the commutator type, said machine comprising an armature 26, a pair of horizontally disposed brushes 27—27, a pair of vertically disposed brushes 28—28, two field windings 29 and 30 mounted in alinement with the brushes 27—27 and two additional field windings 31 and 32 mounted in alinement with the brushes 28—28. The field winding 31 is connected to be energized by the load current of the main motor 7 and thus operates as the exciting field winding 17 in the system of Fig. 1. The field winding 29 is connected in series with the brushes 27—27 across the terminals of the communicating field winding 11 of the main motor. The field windings 30 and 32 are connected in series relation with the brushes 28—28 across the terminals of the secondary winding 33 of a transformer 34, the primary winding 35 of which is connected between the right-hand brush of the main motor 8 and the terminal 23 of the supply winding 12 so that the voltage applied to said primary winding varies inversely with the applied armature voltage of the main motor 7, said armature voltage being adjusted by the movement of the tap 14.

The operation of the system of Fig. 3 is as follows: The desired electromotive force for the excitation of the commutating field winding 11 is produced between the brushes 27—27 in the machine 25. The field winding 31 is the main exciting field winding corresponding to the field winding 17 in Fig. 1, as already explained. The winding 29 neutralizes the armature field caused by the flow of said exciting current from the brushes 27—27. The driving current for the machine 25 is derived from the secondary winding 33 of the transformer 34, the field winding 30 supplying the torque field and the brushes 28—28 supplying the motor-torque current to the armature 26, the field winding 32 neutralizing the armature field established by said torque.

It is frequently desirable to employ simple auxiliary means for properly energizing the commutating field windings of a plurality of main motors, as, for example, on a railway vehicle. A system of this character is shown in Fig. 4 and is an obvious development of the system of Fig. 3.

Four motors 7, 7', 7" and 7''' are employed, and each of said motors comprises appropriately designated armatures, exciting field windings, compensating windings and commutating field windings corresponding to those of the machine 7 in Fig. 1. The motors 7 and 7' are connected in series relation between the terminal 13 of the winding 12 and a junction point 36, and the motors 7" and 7''' are connected in parallel thereto between said two given points. A machine 25, in all respects similar to the machine 25 in Fig. 3, is connected to excite the four commutating field windings 11 to 11''', inclusive, in series-parallel relation. The exciting field winding 31 of the exciting machine 25 is energized in proportion to the total load current of the four main motors by an auto-transformer 37.

While I have shown my invention in a plurality of forms, it will be obvious to those skilled in the art that it is susceptible of various minor changes and modifications without departing from the spirit thereof and I desire, therefore, that only such limitations shall be placed thereupon as are imposed by the prior art or as are set forth in the appended claims.

I claim as my invention:

1. The combination with a source of alternating current, of a main alternating-current motor of the commutator type provided with a commutating field winding, connections from the terminals of said motor to one outer terminal and an adjustable intermediate terminal in said source, an auxiliary exciting machine for energizing said commutating winding and a driving motor for said exciting machine connected between said adjustable intermediate terminal and the other outer terminal of said source, whereby, when said adjustable intermediate terminal is moved to increase the voltage applied to the main motor, the voltage applied to the motor driving said exciting machine is reduced, lowering the speed of said exciting machine and the voltage supplied thereby to said commutating-field winding.

2. The combination with a source of alternating current, of a main alternating-current motor of the commutator type provided with a commutating field winding, connections from the terminals of said motor to one outer terminal and an adjustable intermediate terminal in said source, an auxiliary exciting machine for energizing said commutating winding, connections for energizing the exciting field of said exciting machine in substantially direct proportion to the load current of the main motor, and a driving motor for said exciting machine connected between said adjustable intermediate terminal and the other outer terminal of said source whereby, when said adjustable intermediate terminal is moved to increase the voltage applied to the main motor, the voltage applied to the motor driving said exciting machine is reduced, lowering the speed of said exciting machine and the voltage supplied thereby to said commutating field winding and whereby an increase in the load current of the main motor increases the commutating field thereof.

3. The combination with a source of alternating current, of a main alternating-current dynamo-electric machine of the commutator type connected thereto and provided with a commutating winding, an auxiliary exciter machine connected to energize said commutating field winding, means for exciting said exciter machine in accordance with the load current of said main machine, means for varying the voltage impressed upon said main machine from said source, means for deriving an electromotive force from said source complementary to said impressed electromotive force, and means for employing said complementary electromotive force in driving said exciter machine at a speed substantially inversely proportional to the impressed voltage of said main machine.

4. The combination with a source of alternating current, of a main alternating-current dynamo-electric machine of the commutator type connected thereto and provided with a commutating winding, an auxiliary exciter machine connected to energize said commutating field winding, means for exciting said exciter machine in accordance with the load current of said main machine, means for varying the voltage impressed upon said main machine from said source, means for deriving an electromotive force from said source complementary to said impressed electromotive force, and motor windings mechanically coupled to said exciter machine and energized in accordance with said complementary voltage, whereby the speed of said exciter machine is substantially inversely proportional to the applied voltage of said main machine.

5. The combination with a source of alternating current, of a main alternating-current dynamo-electric machine connected between one terminal of said source and an adjustable point therein, said machine embodying a commutating field winding, an auxiliary exciting machine connected to energize said commutating field winding, means for exciting said auxiliary machine in substantial accordance with the load current of said main machine, and means for driving said auxiliary machine from the portion of said source included between said adjustable point and the remaining terminal thereof, whereby the speed of rotation of said auxiliary machine is caused to be substantially inversely proportional to the voltage applied to said main machine.

In testimony whereof I have hereunto subscribed my name this 1st day of Sept. 1916.

RUDOLF E. HELLMUND.